UNITED STATES PATENT OFFICE.

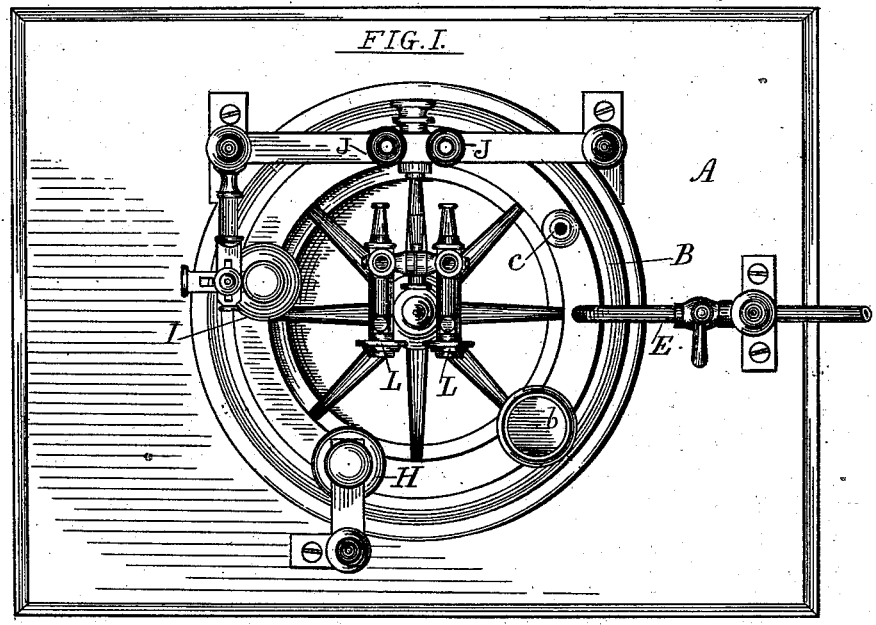

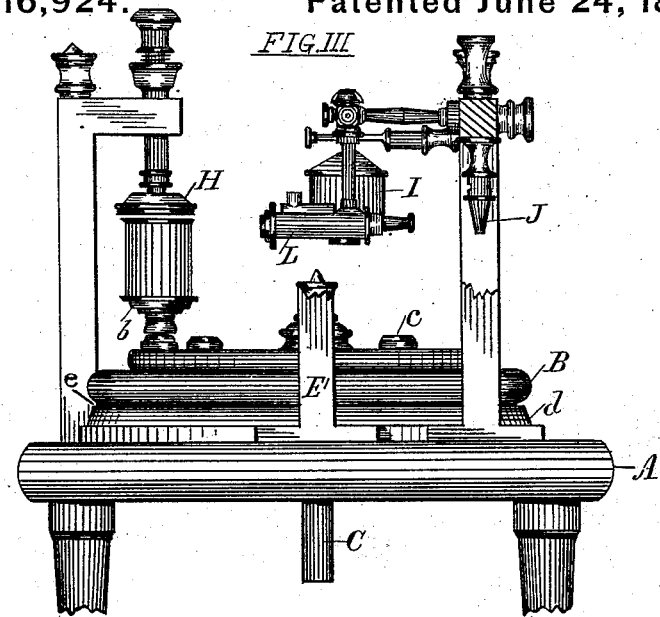
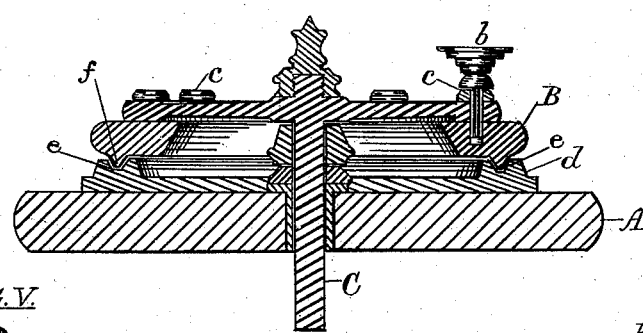
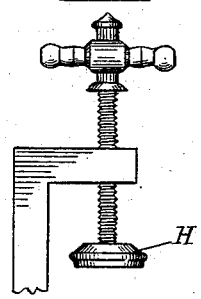
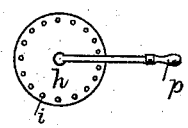
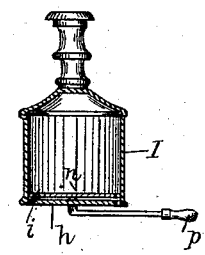

WILLIAM A. WICKS, OF BALTIMORE, MARYLAND.

IMPROVEMENT IN APPARATUS FOR FILLING AND SOLDERING CANS.

Specification forming part of Letters Patent No. 216,924, dated June 24, 1879; application filed April 9, 1879.

*To all whom it may concern:*

Be it known that I, WILLIAM A. WICKS, of Baltimore, in the county of Baltimore and State of Maryland, have invented a new and useful Improvement in Can-Soldering Machines, of which the following is a specification.

This invention relates to an improved apparatus for facilitating the operations of filling fruit and oyster cans and then soldering in the head, thus dispensing with the usual cap altogether.

Cans in which both heads are alike are used for hermetically sealing fresh lobster and salmon, which articles are usually put up in nearly a solid state, and French pease are also put up in such cans with the liquor in which they are cooked, which is simply water, there appearing to be no special difficulty in handling and soldering in by hand the entire head where the contents of the can are of the character described—that is, nearly solid, or with mere water for liquid; but where sirup is used, as in putting up all kinds of fruit, or where saltwater is used, as in putting up fresh oysters, the case is very different, as, should either sirup or salt-water enter the joint between the flange of can body and head, the solder will not take effect.

In fruit-packing houses, where the operatives are largely unskilled—many being women and children, in the capacity of helpers—it is found practically impossible to handle the filled cans in which the open head and cap are dispensed with, and place them in the soldering-machine with care sufficient to prevent the sirup from coming in contact with the rim of can-body where the solder is applied.

The object of the invention, therefore, is to provide an apparatus on which may be placed the can, either empty or partially filled, which apparatus shall embrace means, first, to complete the filling of the can, (the head being next inserted by an attendant;) second, if necessary, to crimp or close in the rim against the head; and, third, to flux and then solder the head, which several operations are to be completed without once handling the can or removing it from its first position, thereby greatly expediting these operations and obviating the difficulty heretofore experienced of using cans without caps.

Figure 1 is a plan of the apparatus. Fig. 2 is a side elevation. Fig. 3 is a transverse side view of same. Fig. 4 is a section of rotary table and its bearing. Fig. 5 is a view of a crimper operated by a screw. Fig. 6 is an inverted plan of the fluxing device. Fig. 7 is a vertical section of the same.

The letter A represents the stand, B the table, C the shaft by which the table is turned, and $b$ the can-holding seats, each provided with a spindle to turn in the socket $c$ in the usual manner; but the spindles may be dispensed with and the can-seats secured rigidly to the table, if desired. A support, $d$, is secured to the stand, and its upper edge is provided with a groove, $e$, with which a bead or tongue, $f$, on the lower side of table and near its outer edge is in contact. This groove constitutes a guide and a support for the movable table, rendering the latter steady under the operation of crimping or closing in the rim against the head of the can, which operation, without the described support, would cause such a shock and jar as to slosh the sirup in the unsoldered cans against the rim where the solder is applied.

E represents a pipe supported by the standard E', and provided with a cock and placed in such position relative to the movable table as to supply to the partly-filled can when moved under the cock the sirup or liquid necessary to fill the interstices of the contents.

H is the crimping device for closing the flange of the can-body over against the end or head.

I do not here claim any particular form of crimper, as either of several forms already patented may be used.

Any suitable mechanism may be employed to operate the crimper, one form being shown in Fig. 3, and another—namely, a screw—in Fig. 5.

I represents a device to contain rosin or other fluxing material to be applied to the can, and is sustained and adjusted by means of an arm and a slotted bar and set-screw.

In the present example the fluxer consists of a receptacle having a circular bottom, $h$, (see Fig. 6,) provided with a series of small holes, $i$, arranged in a circle near its edge. A disk, $n$, also has a series of holes, and is pivoted at the center to the bottom, and is provided with a lever-handle, p, by which the disk may be shaken or rotated, so as to cause the powdered rosin to pass through the holes and discharge onto the can-head. Any well-known form of fluxer, however, may be used, as my present invention does not relate to any particular construction for that device.

J are the soldering-tubes to convey the solder, either in a solid or fluid state, to the can-head.

L represents gas-burners, which may be adjusted vertically, so as to bring the jet directly on the soldering-tubes, as would be necessary when wire solder is used, or they may be adjusted to bring the jet against the upper rim of can, or against a well-known form of a circular-faced soldering-iron, thus permitting of the use of rings of wire solder and dispensing with the tubes.

In the operation of the apparatus, a can nearly filled with the more solid part of the material is placed on a seat under the filling-pipe, and the sirup or liquor, as the case may be, is added. By the movement of the table, which is effected by means of any suitable mechanism, the can is carried forward, the head placed in by an attendant, and the can brought to rest under the crimper. After being crimped it is next brought under the fluxer, and finally under the soldering device.

It will be seen that in this one apparatus provision is made for all the operations of filling, placing in the head by an attendant, crimping the rim of can-body against the head, fluxing preparatory to soldering, and, lastly, soldering, the successive steps being all adapted to each other, and the result of the co-operation of the parts being to permit of can-heads without caps to be soldered by machinery after the can has been filled, thus expediting the operation, lessening the cost, and providing means whereby such cans may be used in factories or packing-houses.

If the can used be of such construction as not to require crimping of the rim, of course the crimper may be dispensed with, and the other described operations may be effected with the same advantageous result of not soiling with sirup the parts constituting the joint.

Having described my invention, I claim and desire to secure by Letters Patent of the United States—

1. The combination of a movable table, a filling-pipe provided with a cock, a fluxing device, and a soldering device, as and for the purpose set forth.

2. The combination of a movable table, a supply-pipe, a crimping device to close the rim against the head of can, and a soldering device, as and for the purpose set forth.

3. The combination, as herein set forth, of a movable table provided with can-seats, a vertically-operated crimping device to close the rim against the head of can, and a soldering device.

4. The combination, substantially as set forth, of a movable table, a crimping device to close the rim against the head of can, a soldering device, and a support or bearing under the table, for the purpose set forth.

WILLIAM A. WICKS.

Witnesses:
 CHAS. B. MANN,
 JNO. T. MADDOX.